United States Patent
Duer et al.

(10) Patent No.: US 9,749,345 B2
(45) Date of Patent: Aug. 29, 2017

(54) REPORTING SECURITY VULNERABILITY WARNINGS

(71) Applicant: International Business Machines Corporation, Armonk, NY (US)

(72) Inventors: Kristofer A. Duer, Manchester, NH (US); Omer Tripp, Bronx, NY (US); Stephen D. Teilhet, Milford, NH (US); John T. Peyton, Jr., Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/692,937

(22) Filed: Apr. 22, 2015

(65) Prior Publication Data

US 2016/0315961 A1   Oct. 27, 2016

(51) Int. Cl.
*H04L 29/06* (2006.01)
(52) U.S. Cl.
CPC .............. *H04L 63/1433* (2013.01)
(58) Field of Classification Search
CPC ................................... H04L 63/1433
See application file for complete search history.

(56) References Cited

U.S. PATENT DOCUMENTS

| | | | |
|---|---|---|---|
| 7,437,763 B2 | 10/2008 | Guo | |
| 7,712,132 B1 * | 5/2010 | Ogilvie | G06F 21/55 726/22 |
| 7,845,006 B2 * | 11/2010 | Akulavenkatavara | G06F 11/3644 710/260 |
| 7,895,641 B2 * | 2/2011 | Schneier | G06F 21/552 709/208 |
| 7,962,959 B1 * | 6/2011 | Batenin | G06F 21/56 711/133 |

(Continued)

FOREIGN PATENT DOCUMENTS

| | | |
|---|---|---|
| GB | 2412189 A | 9/2005 |
| WO | 2007004209 A1 | 1/2007 |

(Continued)

OTHER PUBLICATIONS

Goodall, John R., Hassan Radwan, and Lenny Halseth. "Visual analysis of code security." Proceedings of the seventh international symposium on visualization for cyber security. ACM, 2010.*

(Continued)

*Primary Examiner* — Shawnchoy Rahman
(74) *Attorney, Agent, or Firm* — Brian J. Colandreo, Esq.; Jeffrey T. Placker, Esq.; Holland & Knight LLP (57) ABSTRACT

A computer-implemented method, computer program product, and computing system is provided for reporting security vulnerabilities. In an embodiment, a method may include receiving a set of potential security vulnerabilities associated with a program. The method may also include filtering the set of potential security vulnerabilities by eliminating one or more spurious security vulnerabilities to generate a set of likely security vulnerabilities. The method may further include consolidating the set of likely security vulnerabilities into one or more solution categories, each of the one or more solutions categories defining a solution for remedying each of the likely security vulnerabilities within the solution category.

21 Claims, 3 Drawing Sheets

(56) References Cited

U.S. PATENT DOCUMENTS

| | | | |
|---|---|---|---|
| 2003/0056116 A1 | 3/2003 | Bunker et al. | |
| 2007/0121596 A1* | 5/2007 | Kurapati | H04L 29/06027 370/356 |
| 2007/0180490 A1 | 8/2007 | Renzi et al. | |
| 2011/0302566 A1* | 12/2011 | Abadi | G06F 21/577 717/168 |
| 2013/0332910 A1* | 12/2013 | Ganai | G06F 11/3692 717/131 |
| 2014/0047546 A1* | 2/2014 | Sidagni | G06F 21/577 726/25 |
| 2014/0259170 A1 | 9/2014 | Amsler | |
| 2014/0366140 A1 | 12/2014 | Chen et al. | |
| 2015/0121532 A1* | 4/2015 | Barel | G06F 21/577 726/25 |
| 2015/0281278 A1* | 10/2015 | Gooding | H04L 63/20 726/1 |
| 2015/0358292 A1* | 12/2015 | Karale | H04L 63/0263 726/11 |

FOREIGN PATENT DOCUMENTS

| | | |
|---|---|---|
| WO | 2012025865 A1 | 3/2012 |
| WO | 2014094151 A1 | 6/2014 |

OTHER PUBLICATIONS

Newsome, James, David Brumley, and Dawn Song. "Vulnerability-specific execution filtering for exploit prevention on commodity software." (2006).*

Shin, Yonghee, et al., "An Empirical Model to Predict Security Vulnerabilities Using Code Complexity Metrics," In Proceedings of the Second ACM-IEEE International Symposium on Empirical Software Engineering and Measurement, pp. 315-317 (Oct. 9-10, 2008).

* cited by examiner

REPORTING SECURITY VULNERABILITY WARNINGS

TECHNICAL FIELD

The present disclosure generally relates to systems and method for reporting security vulnerability warnings, and more particularly relates to providing efficient fix point reporting of security vulnerability warnings.

BACKGROUND

Modern software systems, and in particular web and mobile applications, are the target of increasingly many attacks and attack types. Examples of the attack types may include e.g. cross-site scripting (XSS), cross-application scripting (XAS), SQL injection (SQLi), log forging, etc. Many modern software applications are of increasing size and complexity, and may often include multiple abstraction layers, and large third-party libraries, and may perform nontrivial pointer-based computations. As such, manually testing and examining such software applications for potential security vulnerabilities can be so time consuming as to be impractical. For this reason, there has been an increasing need for, and interest in, automated methods for detection of potential security vulnerabilities. Indeed, static security verification, which may be based on program analysis techniques, and in particular the theory of abstract interpretation, has enjoyed a great deal of success throughout the last decade by being able to scale to large programs and uncover latent vulnerabilities.

However, as software is becoming both larger and more complex, there is a parallel trend of decreases in the usability of security verification tools. One cause for the decrease in the usability of security verification tool may stem from the increased complexity, which may lead to false warnings (aka false positives). Additionally, the size of the software applications, can result in an overwhelming number of reported security vulnerabilities. Combined, these two factors can often lead to enormous security reports, which may include many thousands of warnings, with many, if not most, of the warnings included within the security report being false positives—items that do not actually represent a security vulnerability. The large number or reported security vulnerabilities, many of which may be erroneous, can often be beyond what user, or even a team of users, can effectively manage to review and translate into security enhancing code changes.

SUMMARY OF DISCLOSURE

According to an implementation, a computer-implemented method may include receiving, by a processor, a set of potential security vulnerabilities associated with a program. The method may also include filtering, by the processor, the set of potential security vulnerabilities by eliminating one or more spurious security vulnerabilities to generate a set of likely security vulnerabilities. The method may further include consolidating, by the processor, the set of likely security vulnerabilities into one or more solution categories, each of the one or more solutions categories defining a solution for remedying each of the likely security vulnerabilities within the solution category.

One or more of the following features may be included. Receiving the set of potential security vulnerabilities associated with the program may include conducting a static analysis of source code associated with the program. Receiving the set of potential security vulnerabilities associated with the program may include conducting dynamic analysis of the program. Filtering the set of potential security vulnerabilities may include pre-filtering the set of potential security vulnerabilities based upon, at least in part, an established set of heuristics for removing known patterns of false positives. Filtering the set of potential security vulnerabilities may apply statistical learning and user feedback to identify false positive potential security vulnerabilities. Consolidating the set of likely security vulnerabilities into one or more solution categories may include analyzing each likely security vulnerability to identify an issue type associated with each likely security vulnerability. Consolidating the set of likely security vulnerabilities into one or more solution categories may include analyzing each likely security vulnerability to identify code locations associated with each likely security vulnerability.

According to another implementation, a computer program product includes a non-transitory computer readable storage medium having a plurality of instructions stored on it. When executed by a processor, the instructions may cause the processor to perform operations including receiving a set of potential security vulnerabilities associated with a program. Instructions may also be included for filtering the set of potential security vulnerabilities by eliminating one or more spurious security vulnerabilities to generate a set of likely security vulnerabilities. Instructions may further be included for consolidating the set of likely security vulnerabilities into one or more solution categories, each of the one or more solutions categories defining a solution for remedying each of the likely security vulnerabilities within the solution category.

One or more of the following features may be included. Receiving the set of potential security vulnerabilities associated with the program may include conducting a static analysis of source code associated with the program. Receiving the set of potential security vulnerabilities associated with the program may include conducting dynamic analysis of the program. Filtering the set of potential security vulnerabilities may include pre-filtering the set of potential security vulnerabilities based upon, at least in part, an established set of heuristics for removing known patterns of false positives. Filtering the set of potential security vulnerabilities may apply statistical learning and user feedback to identify false positive potential security vulnerabilities. Consolidating the set of likely security vulnerabilities into one or more solution categories may include analyzing each likely security vulnerability to identify an issue type associated with each likely security vulnerability. Consolidating the set of likely security vulnerabilities into one or more solution categories may include analyzing each likely security vulnerability to identify code locations associated with each likely security vulnerability.

According to yet another implementation, a computing system includes a processor and a memory module coupled with the processor. The processor may be configured for receiving a set of potential security vulnerabilities associated with a program. The processor may also be configured for filtering the set of potential security vulnerabilities by eliminating one or more spurious security vulnerabilities to generate a set of likely security vulnerabilities. The processor may further be configured for consolidating the set of likely security vulnerabilities into one or more solutions categories, each of the one or more solutions categories defining a solution for remedying each of the likely security vulnerabilities within the solution category.

One or more of the following features may be included. Receiving the set of potential security vulnerabilities associated with the program may include conducting a static analysis of source code associated with the program. Receiving the set of potential security vulnerabilities associated with the program may include conducting dynamic analysis of the program. Filtering the set of potential security vulnerabilities may include pre-filtering the set of potential security vulnerabilities based upon, at least in part, an established set of heuristics for removing known patterns of false positives. Filtering the set of potential security vulnerabilities may apply statistical learning and user feedback to identify false positive potential security vulnerabilities. Consolidating the set of likely security vulnerabilities into one or more solution categories may include analyzing each likely security vulnerability to identify an issue type associated with each likely security vulnerability. Consolidating the set of likely security vulnerabilities into one or more solution categories may include analyzing each likely security vulnerability to identify code locations associated with each likely security vulnerability.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The increasing size and complexity of many modern software applications may present challenges to the detection, and correction, of security vulnerabilities, or other defects or problems, within software applications. Consistent with some aspects of the present disclosure, some of the problems and challenges associated the large number of reported security vulnerabilities, many of which may represent erroneous reportings, may be alleviated. For example, consistent with some embodiments, the present disclosure may allow at least a portion of the false positive security vulnerabilities to be identified or eliminated from a security vulnerability reporting, which may increase the proportion of true security vulnerabilities (e.g., which may be repaired to improve the quality and/or performance of the software) to false positive security vulnerability reportings (e.g., which do not actually need to be repaired to improve the quality or performance of the software). This may effectively increasing the signal to noise ration of true security vulnerabilities to false positive, or erroneous, security vulnerability reports. Further, the present disclosure may allow the security vulnerabilities that remain after the elimination of at least a portion of the false positives, to be grouped according to common solutions, in which a single fix or solution may remedy the security vulnerabilities associated with all the members in a given group.

In an embodiment, a set of potential security vulnerabilities associated with a program (e.g., a software application) may be received. Receiving the set of potential security vulnerabilities may include, for example, conducting one or more security analysis scans of the program. Examples of security analysis scans may include, but is not limited to, static security analysis, dynamic security analysis, glass box security analysis (e.g., runtime analysis), of some other suitable security analysis scan, or combination of scans. In some embodiments, receiving the set of potential security vulnerabilities associated with a program may include receiving a report of security vulnerabilities (e.g., a report of security vulnerability warnings) that may have been compiled by a security verification application, and/or that may have originated from some other source and/or analysis.

In an embodiment, the set of potential security vulnerabilities associated with the program may be filed to identify at least a portion of the potential security vulnerabilities as being false positives. In an embodiment, a set of likely security vulnerabilities may be generated. In an embodiment, the set of likely security vulnerabilities may be generated by removing the potential security vulnerabilities identified as being false positives from the set security vulnerabilities. Of course, the set of likely security vulnerabilities may be otherwise generated (e.g., by collecting the potential security vulnerabilities not identified as being false positives, etc.). Filtering the set of potential security vulnerabilities may utilize a set of established heuristics for removing known patterns of false positives. In an embodiment, the set of established heuristics may represent a pre-filtering process. Further, filtering may include applying machine learning techniques to the set of potential security vulnerabilities to identify potential security vulnerabilities that likely represent actual security vulnerabilities that may be repaired to improve the security and/or operation of the program. In an embodiment, the machine learning techniques may be applied to the set of potential security vulnerabilities that remain after eliminating false positives using the set of heuristics. Accordingly, in some embodiments the set of potential security vulnerabilities may be greatly reduce, through the elimination of false positives, to provide a significantly smaller set of likely security vulnerabilities.

The set of likely security vulnerabilities may be consolidated into solution categories. In an embodiment, consolidating the list of likely security vulnerabilities into a plurality of solution categories (e.g., solution category groups) may identify likely security vulnerabilities that are of the same type and/or that traverse the same code portions of the program. Such likely security vulnerabilities may be places in the same solution category. In some embodiments, likely security vulnerabilities included within the same solution category may be fixed using the same code fix. As such, consolidating the set of likely security vulnerabilities into a plurality of solution categories may identify the most efficient repairs or modifications to the code of the program.

As such, consistent with the present disclosure, it may be possible to identify the most efficient fix points for remedying vulnerabilities within a software product. For example, findings may identify potential vulnerabilities or defects within a software product. The findings may be pre-filtered to remove "noise," i.e., items that are known to no present actual vulnerabilities. The findings, with the noise items removed, may then be further filtered using machine learning techniques to identify items within the findings that may be considered the most important, e.g., in terms of being the most severe or serious vulnerability, or in terms of representing items that may be repaired to provide the most important or significant improvements in security or performance of the program. The findings set identified using machine learning filtering techniques may be grouped based upon common nodes. The common nodes may be issue types and/or may be code sections that each vulnerability within the group passes through. As such, the common nodes may present the most efficient fix points for remedying the vulnerabilities. That is, for example, because each vulnerability within a group passes through the same node, a fix of the node that is common to the group may fix all of the vulnerabilities included within that group. Therefore, in some aspects, the present disclosure may be, at least in part, directed at identifying efficient fix points for vulnerabilities. For example, the present disclosure may provide techniques for managing sets, potentially very large sets, of identified possible security vulnerabilities, in which the identified possible security vulnerabilities may include many false positives and/or identified security vulnerabilities of less interest to the user.

Figure 1:
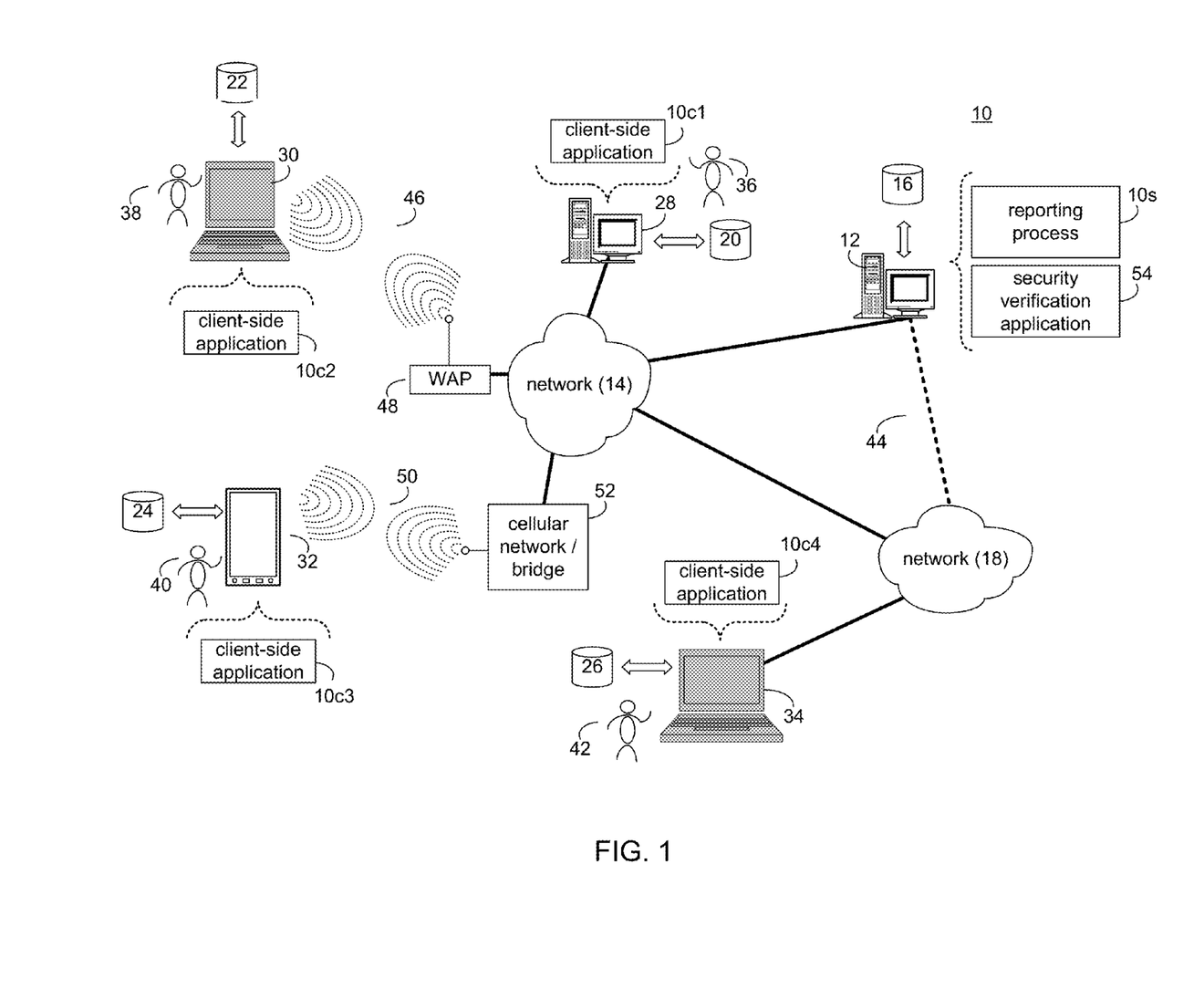
FIG. 1 is a diagrammatic view of a distributed computing network including a computing device that executes a reporting process according to an implementation of the present disclosure.

Referring to FIG. 1, there is shown reporting process 10. For the following discussion, it is intended to be understood that reporting process 10 may be implemented in a variety of ways. For example, reporting process 10 may be implemented as a server-side process, a client-side process, or a server-side/client-side process.

For example, reporting process 10 may be implemented as a purely server-side process via reporting process 10s. Alternatively, reporting process 10 may be implemented as a purely client-side process via one or more of client-side application 10c1, client-side application 10c2, client-side application 10c3, and client-side application 10c4. Alternatively still, reporting process 10 may be implemented as a server-side/client-side process via server-side reporting process 10s in combination with one or more of client-side application 10c1, client-side application 10c2, client-side application 10c3, and client-side application 10c4. In such an example, at least a portion of the functionality of reporting process 10 may be performed by reporting process 10s and at least a portion of the functionality of reporting process 10 may be performed by one or more of client-side application 10c1, 10c2, 10c3, and 10c3.

Accordingly, reporting process 10 as used in this disclosure may include any combination of reporting process 10s, client-side application 10c1, client-side application 10c2, client-side application 10c3, and client-side application 10c4.

Figure 2:
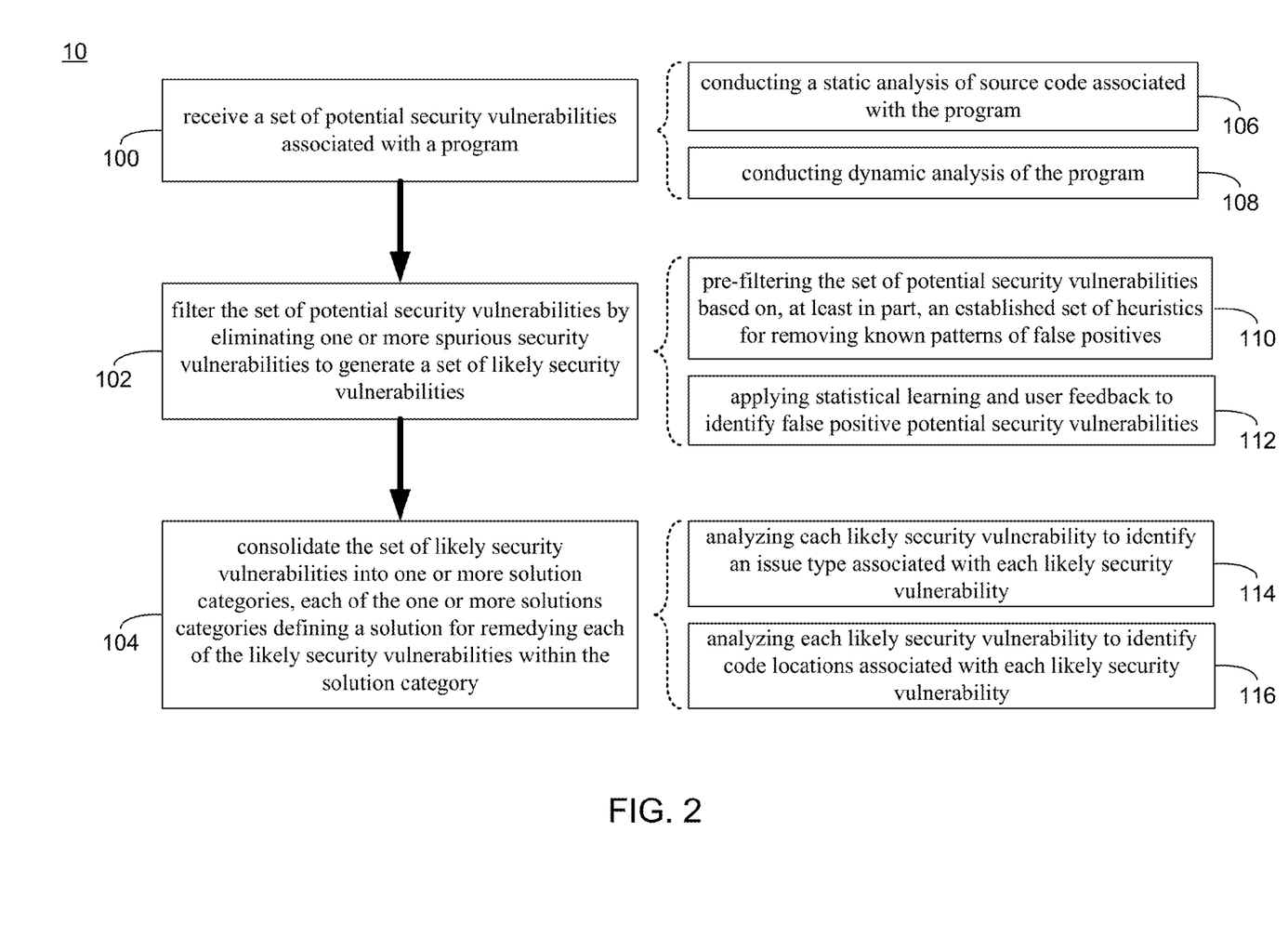
FIG. 2 is a flowchart of the reporting process of FIG. 1, according to an implementation of the present disclosure.

Referring also to FIG. 2, and as will be discussed in greater detail below, reporting process 10 may receive 100 a set of potential security vulnerabilities associated with a program. Reporting process 10 may filter 102 the set of potential security vulnerabilities by eliminating one or more spurious security vulnerabilities to generate a set of likely security vulnerabilities. Reporting process 10 may further consolidate 104 the set of likely security vulnerabilities into one or more solution categories, each of the one or more solutions categories defining a solution for remedying each of the likely security vulnerabilities within the solution category.

Reporting process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of reporting process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, a security analysis application, a web browser (e.g., which may provide a client-side interface for another application), or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access reporting process 10 directly through network 14 or through secondary network 18. Further, reporting process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, reporting process 10 may communicate with, interact with, and/or include a component or module of a security verification application (e.g., security verification application 54). As is generally known, a security verification application (e.g., security verification application 54) may generally facilitate analyzing software applications for potential security vulnerabilities, and/or may facilitate the reporting or presentation of security vulnerabilities that may be been identified by another security scan application or suite of security scan applications. For example, security verification application 54 may execute one or more security analysis tests, or testing modalities, over a software application (also referred to as a "program" herein). In some embodiments, security verification application 54 may provide a report including an indication and/or listing of the items identified by the security analysis tests as presenting a potential security vulnerability in the software application. An example of communication application 54 may include, but is not limited to, IBM® Security AppScan® (IBM and AppScan are registered trademarks of International Business Machine Corporation in the United States, other countries, or both).

In an embodiment, the instruction sets and subroutines of security verification application 54 may be stored, e.g., on storage device 16 associated with server computer 12, which executes security verification application 54, and/or another suitable storage device. Further, users (e.g., one or more of users 36, 38, 40, 42) may access security verification application 54 in order to conduct security analysis of a software application, to receiving a report of identified potential security vulnerabilities within a software application, and/or to perform one or more actions with respect to the identified potential security vulnerabilities within the software application. The users may access security verification application 54 via one or more suitable applications, such as client side applications 10c1-10c4 (e.g., which may include a security analysis application, a web browser, or another application) and/or via a different application (not shown). Additionally, while some users are depicted as being connected with server computer 12 (and therefore with security verification application 54) via network 14, which may include the Internet, in other embodiments, one or more users may be directed connected to server computer 12 and/or connected with server computer 12 via, e.g., a local area network and/or similar connection.

As generally discussed above, a portion and/or all of the functionality of reporting process 10 may be provided by one or more of client side applications 10c1-10c4. For example, in some embodiments reporting process 10 (and/or client-side functionality of reporting process 10) may be included within and/or interactive with client-side applications 10c1-10c4, which may include client side security analysis applications, web browsers, or another application. Various additional/alternative configurations may be equally utilized.

As generally discussed above with reference to FIG. 2, reporting process 10 may receive 100 a set of potential security vulnerabilities associated with a program. Reporting process 10 may filter 102 the set of potential security vulnerabilities by eliminating one or more spurious security vulnerabilities to generate a set of likely security vulnerabilities. Reporting process 10 may further consolidate 104 the set of likely security vulnerabilities into one or more solution categories, each of the one or more solutions categories defining a solution for remedying each of the likely security vulnerabilities within the solution category.

For example, reporting process 10 may receive 100 a set of potential security vulnerabilities associated with a program. In general, receiving 100 the set of potential security vulnerabilities may include running an analysis engine (such as security verification application 54, or another analysis engine) on a target program (e.g., some piece of software) to obtain an initial set of security vulnerability warnings. As used herein security vulnerability and security vulnerability warning may be used in a generally interchangeable manner. According to various implementations the set of potential security vulnerabilities may identify various attributes of each potential security vulnerability, such as the nature or type of vulnerability, a location within the program where the security vulnerability arises, code portions implicated in the security vulnerability, or the like. It will be appreciated that any one or more of the above attributes, and/or any additional or alternative attributes of each security vulnerability may be provided. Further, the type of information provided for each security vulnerability may vary depending upon the type of security vulnerability, the security analysis tool used to identify the security vulnerability, user preferences, or the like.

Consistent with the foregoing, in an embodiment receiving 100 the set of potential security vulnerabilities associated with the program may include conducting 106 a static analysis of source code associated with the program. Further, in some embodiments, receiving 100 the set of potential security vulnerabilities associated with the program may include conducting 108 dynamic analysis of the program. Receiving 100 the set of potential security vulnerabilities may also include conducing other forms of security screening or analysis, such as runtime, or glass box, testing. Further, receiving 100 the set of potential security vulnerabilities associated with the program may include conducting a variety or array of security analysis relative to the program.

Receiving 100 the set of potential security vulnerabilities may include receiving one or more security vulnerability reports. The one or more security vulnerability reports may be generated by one or more security analysis tools. Further, in some instances, one or more security vulnerability reports, each including a set of potential security vulnerabilities, may be separately received, and/or may be combined or consolidated into a single report, or set of potential security vulnerabilities. As such, receiving 100 the set of potential security vulnerabilities may serve to identify potential security vulnerabilities associated with the program.

Reporting process 10 may filter 102 the set of potential security vulnerabilities by eliminating one or more spurious security vulnerabilities to generate a set of likely security vulnerabilities. Accordingly, filtering 102 may remove likely and/or definite false positives from the set of potential security vulnerabilities. That is, filtering 102 the set of potential security vulnerabilities may remove the "noise" from the set of potential security vulnerabilities to provide a set of likely security vulnerabilities—identified security vulnerabilities that likely represent a real security vulnerability or problem with the program. In this regard, filtering may generally reduce the set of potential vulnerabilities that may be analyzed (e.g., during a subsequent consolidation process or operation and/or another analysis or debugging operation). By reducing the number of security vulnerabilities that may be addressed during subsequent operations, the performance of such subsequent operations may be improved, e.g., as the subsequent operations only need to address a smaller problem set (e.g., the set of likely security vulnerabilities).

Filtering 102 the set of potential security vulnerabilities may include pre-filtering 110 the set of potential security vulnerabilities based on, at least in part, an established set of heuristics for removing known patterns of false positives. For example, various heuristics may be empirically, or otherwise, developed for identifying patterns of false positive security vulnerabilities (e.g., items that may be identified as being a security vulnerability, but which may actually not represent a security vulnerability in the program, or may represent a security vulnerability that is considered to be minor, insignificant, or otherwise of little interest). The established heuristics may be applied to the set of potential security vulnerabilities to remove such false positives. In some implementations, the established set of heuristics may be utilized to quickly, and relatively easily, remove such false positives. As such, the established set of heuristics may be utilized as a pre-filtering operation to relatively quickly and/or easily remove at least a portion of the false positives from the set of potential security vulnerabilities before additional filtering operations, which may be more time and/or resource intensive. As such, the relatively more time and/or resource intensive operations may be applied to a smaller set of potential security vulnerabilities, thereby reducing the overall time and/or resources necessary for such additional operations.

Filtering 102 the set of potential security vulnerabilities may include applying 112 statistical learning and user feedback to identify false positive potential security vulnerabilities. In some embodiments, statistical learning may be utilized in conjunction with user feedback to identify false positives within the set of potential security vulnerabilities. Further, the statistical learning with user feedback may, over time, provided increased performance, for example, in terms of the speed and/or accuracy with which false positives may be identified within the set of potential security vulnerabilities. In some embodiments, the statistical learning with user feedback operations may be applied to the initial set of potential security vulnerabilities. In some embodiments, the statistical learning with user feedback filtering operations may be applied to the set of potential security vulnerabilities that has been pre-filtered, e.g., through the use of the sets of established heuristics. In addition/as an alternative to statistical learning, various other filtering operations, including e.g., more precise analysis, may be applied to the set of potential security vulnerabilities to remove false positives. Removal of at least a portion of the false positives from the set of potential security vulnerabilities may provide a set of likely security vulnerabilities, which may include actual security vulnerabilities and/or security vulnerabilities of a nature and/or importance that repairing and/or addressing the likely security vulnerabilities may be desired.

Reporting process 10 may consolidate 104 the set of likely security vulnerabilities into one or more solution categories, each of the one or more solutions categories defining a solution for remedying each of the likely security vulnerabilities within the solution category. For example, the various likely security vulnerabilities remaining after filtering 102 to remove false positives, may be grouped into one or more solution categories. The one or more solution categories may be governed by fix proposals, such that each of the likely security vulnerabilities within a given solution category may be eliminated by the same fix being applied to the code of the program. That is, the fix associated with a given solution category may resolve all of the security vulnerabilities consolidated within that given solution category. As such, a solution category may provide the most efficient fix point for the group of security vulnerabilities within the solution category, in that completing a single code fix may resolve multiple security vulnerabilities. It will be appreciated that the "single code fix" may include modifications to multiple code portions. Further, by grouping the security vulnerabilities into such solution categories, a relatively highly efficient approach to resolving security problems with the program may be identified, e.g., as a relatively small, or at least manageable, number of code fixes may resolve a relatively large number of security vulnerabilities.

Consolidating 104 the set of likely security vulnerabilities into one or more solution categories may include analyzing 114 each likely security vulnerability to identify an issue type associated with each likely security vulnerability. For example, each of the likely security vulnerabilities (i.e., each of the security vulnerabilities included within the set of likely security vulnerabilities) may be analyzed to identify the type of issue that is presented by each of the likely security vulnerabilities. The likely security vulnerabilities may be consolidated 104 (e.g., grouped) based upon, at least in part common security vulnerability type.

Consolidating 104 the set of likely security vulnerabilities into one or more solution categories may include analyzing 116 each likely security vulnerability to identify code locations associated with each likely security vulnerability. For example, each of the likely security vulnerabilities may be analyzed 116 to identify code locations that are associated with each of the likely security vulnerabilities. Further, the likely security vulnerabilities may be consolidated 104 based upon, at least in part, code locations implicated in the security vulnerability.

Consistent with the foregoing, in an implementation, consolidating 104 the likely set of security vulnerabilities into one or more solution groups may consider by the issue type associated with each likely security vulnerability and may consider code locations implicated by each likely security vulnerability. In an embodiment, two (or more) likely security vulnerabilities of the same type that traverse the same code portions may be susceptible to being fixed simultaneously, i.e., may be fixed by the same code modification. As such, the two or more likely security vulnerabilities of the same type and traversing the same code portions may be consolidated 104 into a common solution category.

In an embodiment, reporting process 10 may generate an output of the solution categories and/or of the likely security vulnerabilities grouped by solution category. The generated output may include a report, e.g., which may be displayed via a suitable user interface, may be provided in an output file, or otherwise made available. As such, the generated output may be utilized, e.g., for conducting code revisions to repair some, or all, of the likely security vulnerabilities.

As generally described above, in some implementations reporting process 10 may filter the results of the a security analysis to remove one or more false positive security warnings. The security warnings remaining after filtering out the false positives may be grouped, or consolidated, into solution categories. The solution categories may define a common code fix (e.g., code revision or modification) that may resolve all of the security vulnerabilities within the same solution category. In an example, the combined approaches of filtering an consolidating may provide improved performance, e.g., in terms of reducing the number of issues that may be addressed (e.g., code modifications or revisions to be made) to provide a significantly greater reduction in the number of security vulnerabilities. For example, filtering may remove the noise (e.g., at least a portion of the false positives) from the set of identified security vulnerabilities, which may otherwise result in improper consolidation, as false positives may yield incorrect and unnecessary fixes, which may obscure or distort the fixes that may actually be needed to improve the security and/or performance of the program. Further, consolidation may reduce, perhaps greatly, the number of fixes that may be necessary to address meaningful security vulnerabilities within a program. The consolidation of security vulnerabilities may even greatly reduce the number of required fixed below the number of identified likely security vulnerabilities remaining after filtering.

In consideration of the foregoing, the following table presents a number of illustrative example applications that were processed according to one embodiment of the present disclosure to identify potential security vulnerabilities, to filter the potential security vulnerabilities, and to consolidate potential security vulnerabilities into solution categories. In the table below, a comparison is provided between the total number of identified potential security vulnerabilities ("total"), the number of solution categories into which the potential security vulnerabilities may be grouped without filtering ("groups"), the number of likely security vulnerabilities remaining after filtering ("filtered"), and the number of solution category groups resulting from consolidation of filtered likely security vulnerabilities ("filtered groups"). Values indicating the percent relative to the total number of identified potential security vulnerabilities is also provided for each category.

TABLE 1

| Application | Total | Groups | Filtered | Filtered Groups |
|---|---|---|---|---|
| 1 | 269 | 69 (25.65%) | 2 (0.74%) | 2 (0.74%) |
| 2 | 53444 | 1008 (1.899%) | 134 (0.25%) | 12 (0.02%) |
| 3 | 4975 | 309 (6.21%) | 373 (7.5%) | 57 (1.15%) |
| 4 | 15999 | 975 (6.09%) | 221 (1.38%) | 32 (0.2%) |
| 5 | 3918 | 294 (7.5%) | 33 (0.84%) | 12 (0.21%) |

As shown above, for example, in application 5 filtering along may reduce the 3,981 potential security vulnerabilities to a mere set of 33 issues. Consolidation may reduce the 3,918 potential security vulnerabilities to 294 solution groups. While each of filtering and consolidation may reduce the total number of issues that may need to be addressed, the remaining number of required fixes may still be challenging to manage. However, combining both filtering and consolidation may reduce the number of fixes to just 12, which may represent only 0.21% of the total number of originally identified potential security vulnerabilities. As such, a more manageable set of issues may be identified and processed by a development team.

Similarly, the other illustrative applications also demonstrate an appreciable benefit from combining filtering and consolidation techniques. For example, as shown application 4 may present an overwhelming baseline set of 15,999 potential security vulnerabilities. While consolidation may bring the number of issues down to 975, and filtering may reduce the number of issues to 221, either set of required fixes may be challenging to manage. However, by combining filtering and consolidation, the problem set may be reduced to 32 fixes (e.g., about a 99.7% reduction from the original number of identified potential security vulnerabilities) that need to be implemented to resolve the likely security vulnerabilities.

Figure 3:
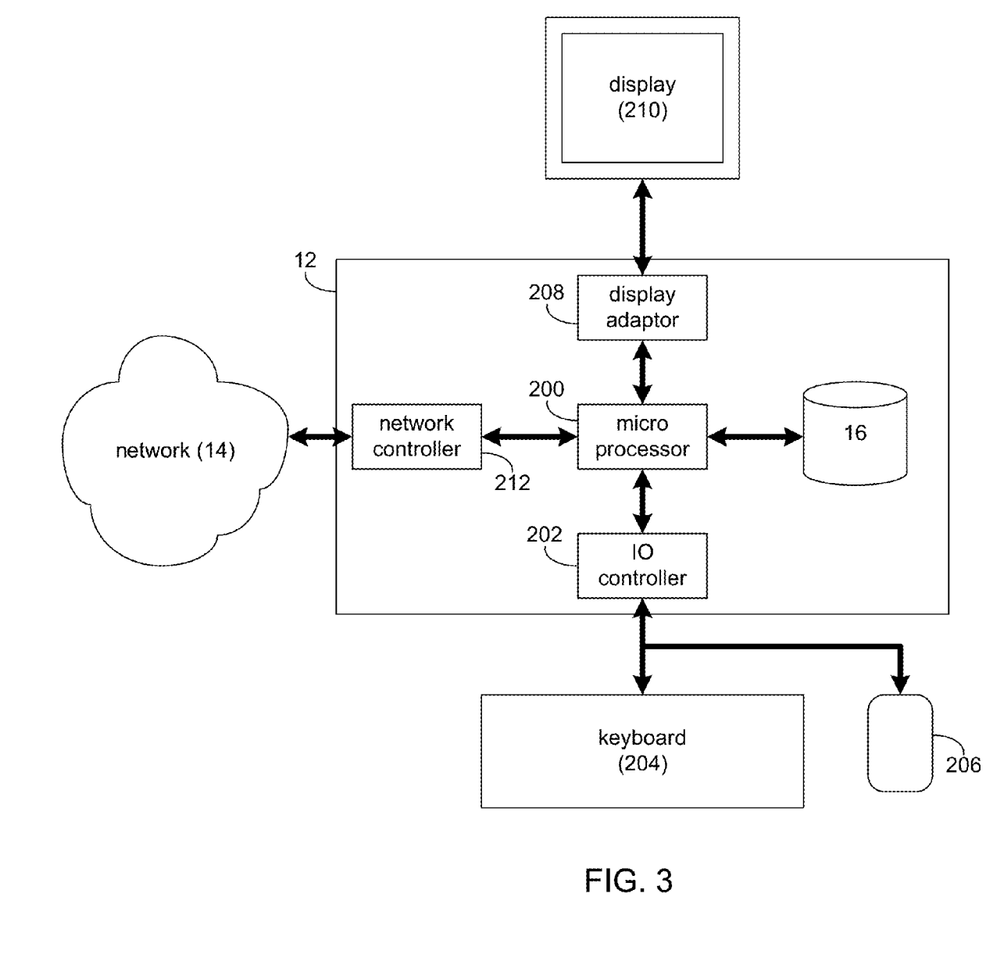
FIG. 3 is a diagrammatic view of the computing device of FIG. 1, according to an implementation of the present disclosure.

Referring also to FIG. 3, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, reporting process 10 may be substituted for computing device 12 within FIG. 3, examples of which may include but are not limited to client electronic devices 28, 30, 32, 34.

Computing system 12 may include microprocessor 200 configured to e.g., process data and execute instructions/code for reporting process 10. Microprocessor 200 may be coupled to storage device 16. As discussed above, examples of storage device 16 may ide but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving, by a processor, a set of potential security vulnerabilities associated with a program;
filtering, by the processor, the set of potential security vulnerabilities by eliminating one or more spurious security vulnerabilities to generate a set of likely security vulnerabilities; and
consolidating, by the processor, the set of likely security vulnerabilities into one or more solution categories, each of the one or more solutions categories defining a code modification for remedying each of the likely security vulnerabilities within the solution category, wherein combining both filtering and consolidation steps results in the reduction of the total number of the received set of potential security vulnerabilities.

2. The computer-implemented method of claim 1, wherein receiving the set of potential security vulnerabilities associated with the program includes conducting a static analysis of source code associated with the program.

3. The computer-implemented method of claim 1, wherein receiving the set of potential security vulnerabilities associated with the program includes conducting dynamic analysis of the program.

4. The computer-implemented method of claim 1, wherein filtering the set of potential security vulnerabilities includes pre-filtering the set of potential security vulnerabilities based upon, at least in part, an established set of heuristics for removing known patterns of false positives.

5. The computer-implemented method of claim 1, wherein filtering the set of potential security vulnerabilities applies statistical learning and user feedback to identify false positive potential security vulnerabilities.

6. The computer-implemented method of claim 1, wherein consolidating the set of likely security vulnerabilities into one or more solution categories includes analyzing each likely security vulnerability to identify an issue type associated with each likely security vulnerability.

7. The computer-implemented method of claim 1, wherein consolidating the set of likely security vulnerabilities into one or more solution categories includes analyzing each likely security vulnerability to identify code locations associated with each likely security vulnerability.

8. A computer program product comprising a non-transitory computer readable storage medium having a plurality of instructions stored thereon, which, when executed by a processor, cause the processor to perform operations including:
receiving a set of potential security vulnerabilities associated with a program;
filtering the set of potential security vulnerabilities by eliminating one or more spurious security vulnerabilities to generate a set of likely security vulnerabilities; and
consolidating the set of likely security vulnerabilities into one or more solution categories, each of the one or more solutions categories defining a code modification for remedying each of the likely security vulnerabilities within the solution category, wherein combining both filtering and consolidation steps results in the reduction of the total number of the received set of potential security vulnerabilities.

9. The computer program product of claim 8, wherein receiving the set of potential security vulnerabilities associated with the program includes conducting a static analysis of source code associated with the program.

10. The computer program product of claim 8, wherein receiving the set of potential security vulnerabilities associated with the program includes conducting dynamic analysis of the program.

11. The computer program product of claim 8, wherein filtering the set of potential security vulnerabilities includes pre-filtering the set of potential security vulnerabilities based upon, at least in part, an established set of heuristics for removing known patterns of false positives.

12. The computer program product of claim 8, wherein filtering the set of potential security vulnerabilities applies statistical learning and user feedback to identify false positive potential security vulnerabilities.

13. The computer program product of claim 8, wherein consolidating the set of likely security vulnerabilities into one or more solution categories includes analyzing each likely security vulnerability to identify an issue type associated with each likely security vulnerability.

14. The computer program product of claim 8, wherein consolidating the set of likely security vulnerabilities into one or more solution categories includes analyzing each likely security vulnerability to identify code locations associated with each likely security vulnerability.

15. A computing system comprising:
a processor and a memory module coupled with the processor, the processor being configured for:
receiving a set of potential security vulnerabilities associated with a program;
filtering the set of potential security vulnerabilities by eliminating one or more spurious security vulnerabilities to generate a set of likely security vulnerabilities; and
consolidating the set of likely security vulnerabilities into one or more solution categories, each of the one or more solutions categories defining a code modification for remedying each of the likely security vulnerabilities within the solution category, wherein combining both filtering and consolidation steps results in the reduction of the total number of the received set of potential security vulnerabilities.

16. The computing system of claim 15, wherein receiving the set of potential security vulnerabilities associated with the program includes conducting a static analysis of source code associated with the program.

17. The computing system of claim 15, wherein receiving the set of potential security vulnerabilities associated with the program includes conducting dynamic analysis of the program.

18. The computing system of claim 15, wherein filtering the set of potential security vulnerabilities includes pre-filtering the set of potential security vulnerabilities based upon, at least in part, an established set of heuristics for removing known patterns of false positives.

19. The computing system of claim 15, wherein filtering the set of potential security vulnerabilities applies statistical learning and user feedback to identify false positive potential security vulnerabilities.

20. The computing system of claim 15, wherein consolidating the set of likely security vulnerabilities into one or more solution categories includes analyzing each likely security vulnerability to identify an issue type associated with each likely security vulnerability.

21. The computing system of claim 15, wherein consolidating the set of likely security vulnerabilities into one or more solution categories includes analyzing each likely security vulnerability to identify code locations associated with each likely security vulnerability.

* * * * *